United States Patent
Montgomery (10) Patent No.: US 9,243,604 B2
(45) Date of Patent: Jan. 26, 2016

(54) IN-PIPE TURBINE (76) Inventor: James Scott Montgomery, San Diego, CA (US)

( * ) Notice: Subject to any disclaimer, the term of this patent is extended or adjusted under 35 U.S.C. 154(b) by 589 days.

(21) Appl. No.: 13/458,866

(22) Filed: Apr. 27, 2012

(65) Prior Publication Data

US 2012/0274066 A1   Nov. 1, 2012

Related U.S. Application Data (60) Provisional application No. 61/518,019, filed on Apr. 29, 2011.

(51) Int. Cl.
*F03B 13/00* (2006.01)
*H02P 9/04* (2006.01)

(52) U.S. Cl.
CPC ............ *F03B 13/00* (2013.01); *F05B 2220/20* (2013.01); *F05B 2220/602* (2013.01); *Y02B 10/50* (2013.01)

(58) Field of Classification Search
CPC ..... Y02E 10/72; Y02E 10/723; Y02E 10/725; H02P 2009/004; F03D 9/003
USPC ..................................................... 290/54, 44
See application file for complete search history.

(56) References Cited

U.S. PATENT DOCUMENTS

| 2,436,683 | A | 2/1948 | Wood, Jr. |
| 4,352,025 | A | 9/1982 | Troyen |
| 4,740,711 | A | 4/1988 | Sato et al. |
| 6,011,334 | A | 1/2000 | Roland |
| 6,056,518 | A * | 5/2000 | Allen et al. .................... 417/355 |
| 6,267,551 | B1 * | 7/2001 | Dentinger ...................... 415/3.1 |
| 7,385,303 | B2 * | 6/2008 | Roos ............................... 290/54 |
| 7,501,712 | B2 | 3/2009 | Bolyard |
| 7,579,703 | B2 | 8/2009 | Shifrin |
| 7,723,860 | B2 | 5/2010 | Nagler |
| 2008/0060712 | A1 * | 3/2008 | Gluzman et al. ................ 138/39 |
| 2009/0008943 | A1 | 1/2009 | Kemper |
| 2012/0038161 | A1 | 2/2012 | Outhred et al. |

FOREIGN PATENT DOCUMENTS

JP    H 02130269    5/1990

* cited by examiner

*Primary Examiner* — Tulsidas C Patel
*Assistant Examiner* — Thomas Quigley
(74) *Attorney, Agent, or Firm* — R. Scott Kimsey, Esq.; Klein DeNatale Goldner (57) ABSTRACT

An in-pipe hydraulic turbine system includes a pipeline for fluid transport, the pipeline having an inlet and an outlet, and a turbine disposed within the pipeline, between the inlet and the outlet. The turbine is actuated by fluid moving through the pipeline and leaves usable fluid pressure downstream of the turbine.

15 Claims, 13 Drawing Sheets

SECTION B-B

IN-PIPE TURBINE

RELATED APPLICATIONS

This application claims priority of U.S. Provisional Patent Application No. 61/518,019, entitled "In-Pipe Turbine" and filed on Apr. 27, 2011. That application is incorporated herein by reference in its entirety.

BACKGROUND OF THE INVENTION

1. Field of the Invention

The present invention relates generally to fluid turbines, and more specifically to in-pipe turbines for generating energy as a result of the movement of fluid through the turbines.

2. Background

Fluid moving through pipelines, such as, for example, water moving through water mains designed to transport potable water, are often at high pressure. In many instances, the amount of pressure in the pipeline is undesirable. In the case of potable water, for example, high-pressure water from a city water main can be damaging to pipes and appliances in a home. The water pressure can produce wear or erosion, and may cause leaks, loud noises in the pipes, and waste of water. In areas where water is scarce, wasted water due to overly high pressure in water pipelines can be a significant problem. Reducing water pressure from 100 psi to 50 psi can result in a 29% savings of water.

While excess fluid pressure can be problematic, such pressure also represents a potential energy source, where the kinetic energy of fluid flowing through a pipeline can be converted into electricity, for example.

What is needed, then, is a device for solving the problem of overly high pressure in a fluid pipeline, while at the same time providing a way to tap into the energy of the fluid moving through the pipeline.

SUMMARY OF THE INVENTION

The present invention provides an in-pipe hydraulic turbine system. The system includes a pipeline for fluid transport, the pipeline having an inlet and an outlet, and a turbine disposed within the pipeline, between the inlet and the outlet. The turbine is actuated by fluid moving through the pipeline and leaves usable fluid pressure downstream of the turbine.

Another aspect of the invention provides that the turbine includes an output shaft with a runner affixed thereto. The output shaft is substantially aligned with the direction of fluid flow through the system.

Another aspect of the invention provides that the system includes a pressure reducing valve downstream of the turbine. The valve is passively operable to control fluid pressure downstream of the turbine.

Another aspect of the invention provides that the turbine is an impulse turbine, a reaction turbine, or that the system includes a hybrid or combination of the two.

Another aspect of the invention provides that the turbine is constructed from materials requiring no lubrication apart from that provided by the fluid moving through the system.

Another aspect of the invention provides that the turbine includes a plurality of running surfaces. The running surfaces are composed of synthetic polymers, metals, ceramics, or combinations of these. The fluid traveling through the system is induced into a plurality of interstitial running spaces of the turbine.

In another aspect of the invention, the system includes a nozzle disposed within the pipeline. The nozzle is between the turbine and the inlet, and is sized and shaped to accelerate the flow of a fluid moving through the pipeline. The fluid is also converted from a substantially axial flow to a substantially tangential flow.

Another aspect of the invention provides that the nozzle is substantially cylindrical and has a diameter concentric within the diameter of the pipeline.

Another aspect of the invention provides that the system includes a diffuser disposed within the pipeline. The diffuser is between the outlet and turbine and sized and shaped to decelerate the flow of a fluid moving through the pipeline. The diffuser also converts the fluid flow from a substantially tangential flow to a substantially axial flow.

Another aspect of the invention provides that the diffuser is substantially cylindrical and has a diameter concentric within the diameter of the pipeline.

In another aspect of the invention, the output shaft drives an electrical generator.

In another aspect of the invention, the electrical generator is an alternating current generator or a direct current generator.

In another aspect of the invention, the electrical generator is regulated by a rectifier, an inverter, or a grid-tieable inverter.

In another aspect of the invention, the pipeline includes an elbow bend with an opening. The output shaft extends through the opening.

In another aspect of the invention, a turbine is provided with an output shaft and runner, the turbine adapted to be affixed within an existing pipeline.

In another aspect of the invention, electrical generation apparatus are housed within the pipeline or its fittings.

DETAILED DESCRIPTION OF THE INVENTION

Figure 1:
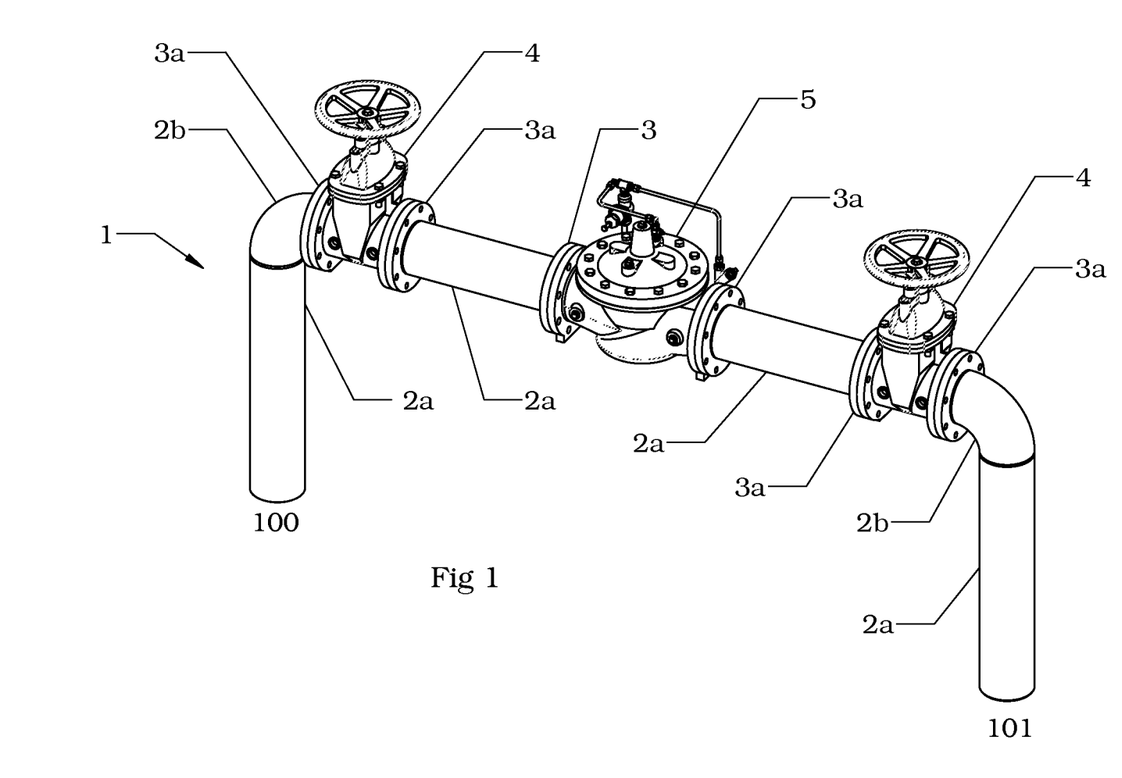
FIG. 1 is a perspective view of one embodiment of a pressure reducing station according to the present invention.

FIG. 1 illustrates the elements of one embodiment of a pressure-reducing station 1 according to the present invention. The embodiment shown may be used, for example, with a potable water supply wherein water is supplied at a higher pressure than can be used by the receiver of the water, or where the pressure is unsafe for the pipe system. Pressurized fluid, such as water in this case, enters the piping segment shown in the Figure with excess pressure at inlet 100. Water is conducted through straight pipe element 2a and, optionally, through an elbow pipe element 2b, to isolation valve 4. Isolation valve 4 is typically a gate valve for isolating a section of pipe from fluid flow in order to facilitate servicing. Any suitable isolation valve may be employed. Pipe elements are preferably bonded together or welded to form a reliable permanent connection between elements. Any suitable method of connection may be used.

Connections to isolation valve 4 or pressure reducing valve 5, as well as to other places where service to the piping system is anticipated, may be facilitated by the addition of pipe flange fitting elements 3a or pipe union fitting elements 3b. These fitting elements are preferably permanently affixed to the pipe ends in order to facilitate easy connection and disconnection of various piping components. Optional isolation valves 4 are placed in the piping segment in order to facilitate any required maintenance. Water is conducted to pressure reducing valve 5 by straight piping element 2a or bent piping element 2b. Water leaves pressure reducing valve 5 in a substantially similar manner as entry, exiting the pressure reducing station, at a reduced pressure, at outlet 101.

Figure 2:
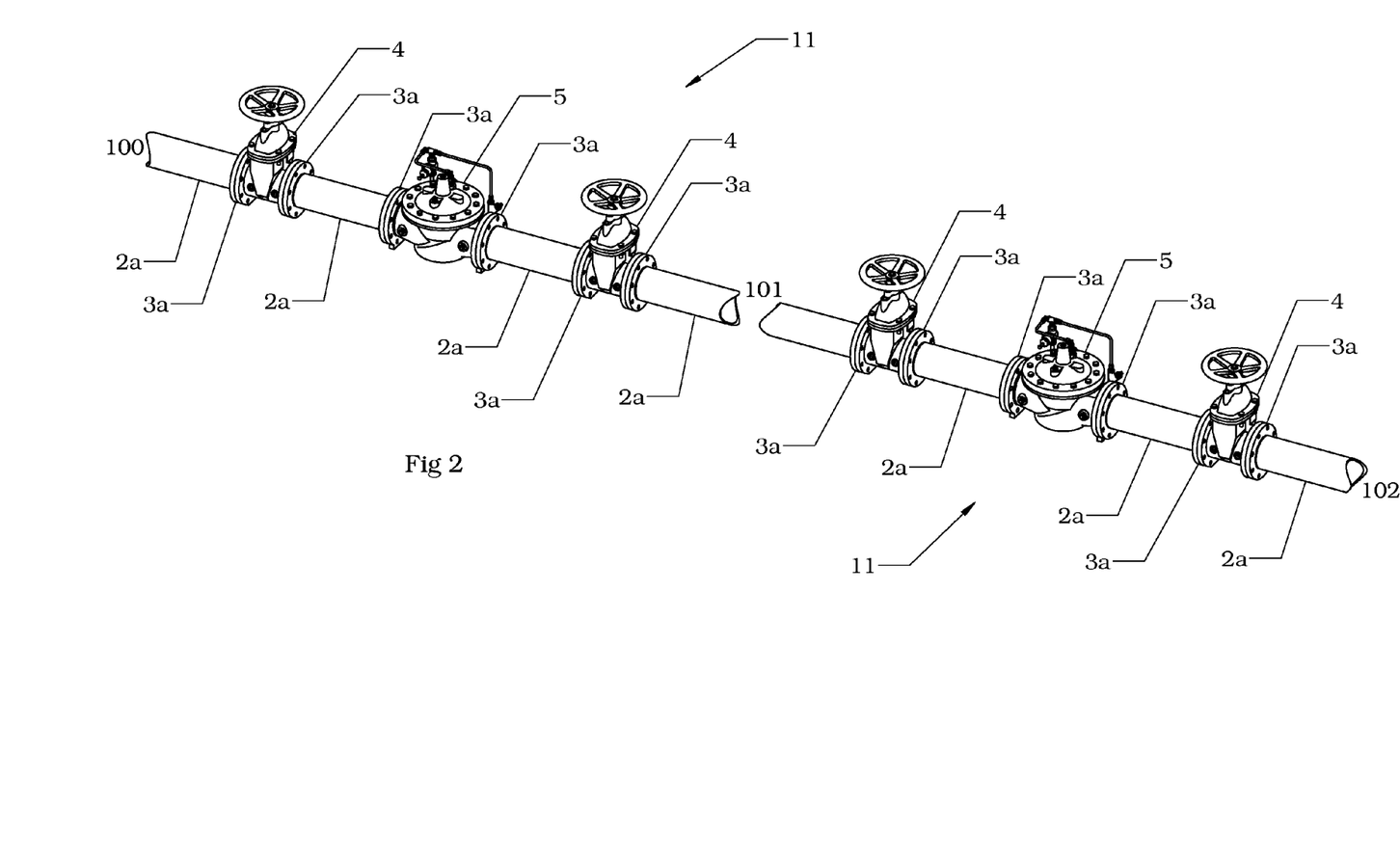
FIG. 2 is a perspective view of two pressure reducing stations of the present invention in series.

FIG. 2 shows two (or more) pressure reducing stations in series along a length of pipe, which may, for example, be along a descending grade. Multiple pressure reducing stations may be employed in pipelines wherein the elevation change or other factors result in more excess pressure than one pressure reducing valve can practically reduce, or to control working pressure along a pipe's length. Water enters the first of the pressure reducing stations 11 at an inlet 100 with an elevated pressure, exiting the first of the pressure reducing stations 11 at a reduced pressure at outlet 101. The water then travels along a length of pipe 2a and encounters a second pressure reducing station 11, which it leaves via outlet 102 at a further reduced pressure. Any number of pressure reducing stations may be used in series as shown in the Figure, and it is contemplated that any number of such stations may be required depending on the pipe used and the pipeline operating conditions.

Figure 3:
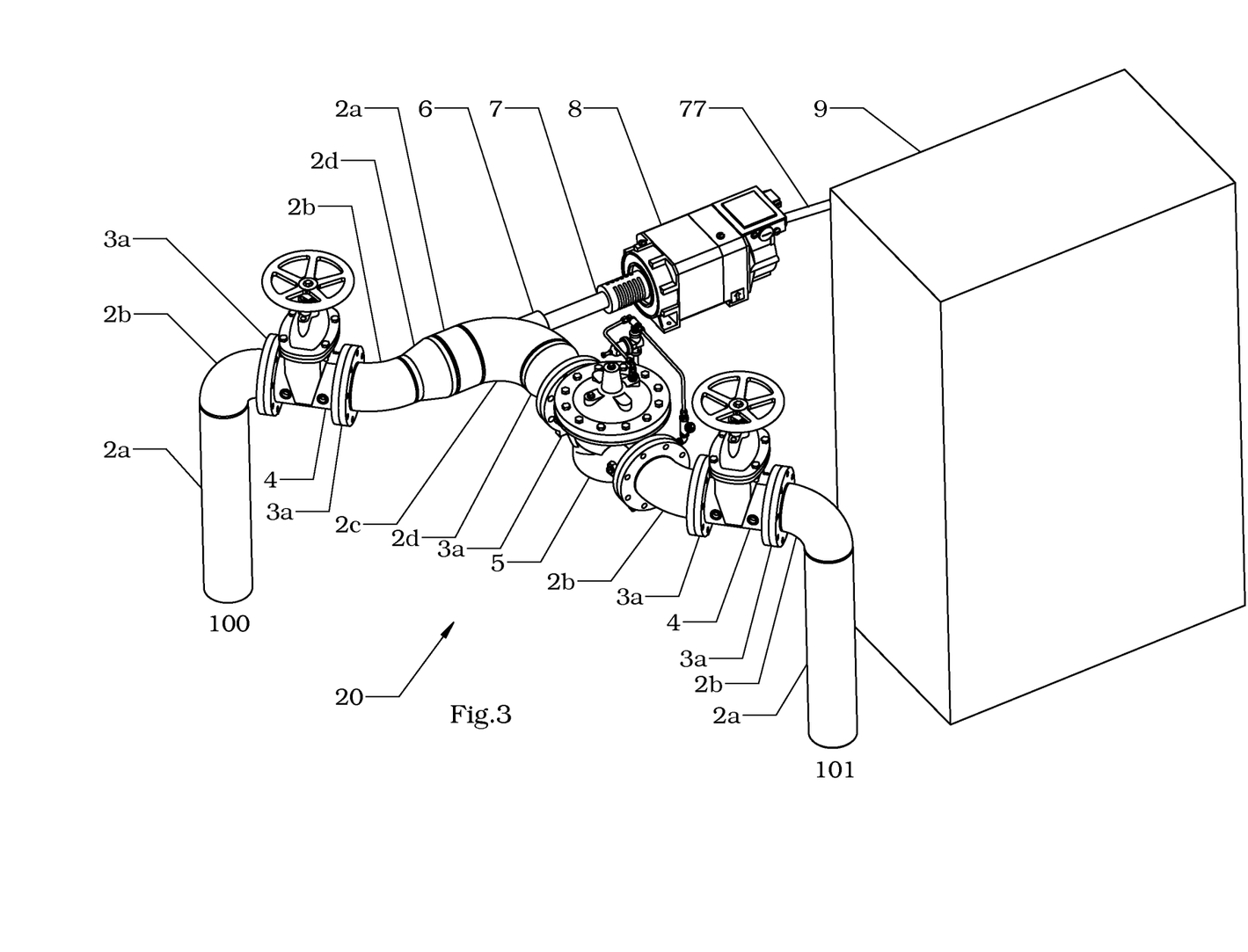
FIG. 3 is a perspective view of an existing pressure reducing station having the in-pipe turbine system of the present invention installed therein.

FIG. 3 shows the installation of an in-pipe turbine to an existing pressure reducing station. Hydraulic power recovery station 20 features additional pipe elements added to the original pressure station's piping in order to facilitate operation of a hydraulic turbine. In the figure, the turbine is housed within piping elements 2a and 2c, with the turbines rotatable drive shaft 7 exiting the plumbing system through stuffing box assembly 6. Elbow piping element 2c preferably includes a bore for accepting stuffing box assembly 6. Stuffing box assembly 6 includes all of the elements necessary to seal drive shaft 7 against leakage while still allowing free rotation thereof. As with the embodiments of the invention described above, water enters the station at an elevated pressure at inlet 100 and is directed through straight piping element 2a and, optionally, elbow piping element 2b, to an optional isolation valve 4.

Water is conducted to the turbine by elbow piping elements 2b. In a typical installation, water may be fed to the turbine by an optional piping element size adapter 2d. It is contemplated that it may be necessary in some embodiments of the present invention that the turbine's housing pipe element 2a have a larger diameter than the pressure reducing station's original piping in order to accommodate the system's flow requirements and turbine hardware housed within piping element 2a. Water moves through the additional bent piping elements 2b and 2d to the turbine, rotating drive shaft 7. The turbine housed within the piping consumes water pressure, converting water pressure to torque and shaft rotation speed. On leaving the turbine section of the piping, water is conducted through a size adapting piping element 2d to pressure reducing valve 5. Pressure reducing valve 5 controls water system pressure at its outlet, adjusting pressure to a preset value. Water leaves pressure reducing valve 5 and is conducted through additional elbow piping elements 2b to optional isolation valve 4, and then out of the system at outlet 101 as previously described. Torque generated by water pressure acting on the internal turbine is conducted by rotatable drive shaft 7 to a drive generator 8. Electrical output from the generator is fed by a feed wire cable 77, preferably including insulated transmission wires, to a rectifier and/or inverter housed within electrical cabinet 9. Electrical output from the inverter is voltage, frequency, and phase-matched as appropriate for powering nearby plant equipment or an electrical grid.

Figure 4:
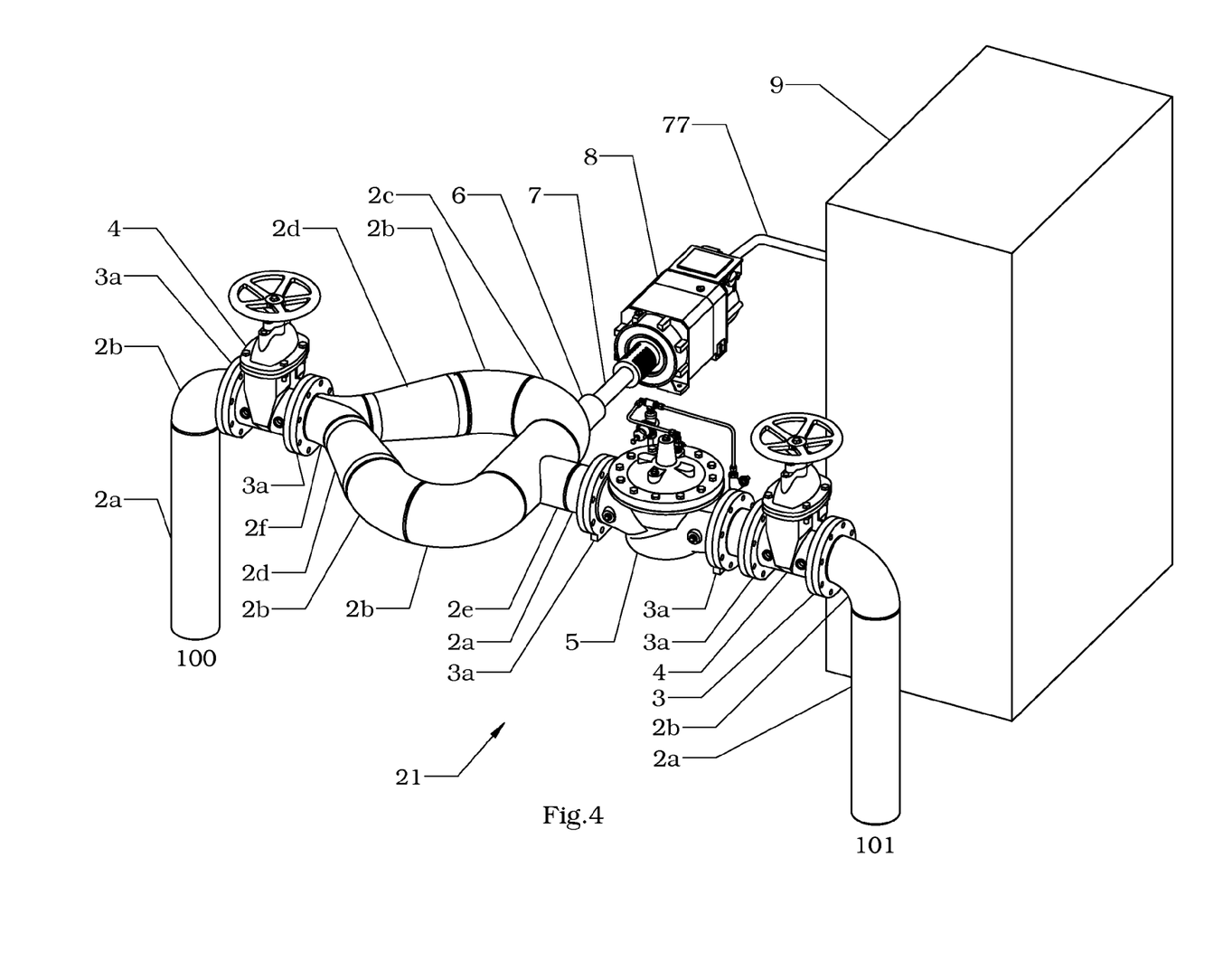
FIG. 4 is a perspective view of one embodiment of the present invention wherein two in-pipe hydraulic turbines are affixed to a single rotatable shaft.

FIG. 4 illustrates an embodiment of a dual turbine power recovery station 21 of the present invention, with water driving two hydraulic turbines fixed to one rotatable drive shaft 7. Water at elevated pressure enters through inlet 100 and is conducted to wye piping element 2f, where water flow is divided into two similar elbow pipe elements 2b and 2d, each optionally fed by pipe size adapter 2d. Hydraulic turbines are housed within tee piping element 2e, which is fed on either side by elbow piping element 2b and elbow piping element 2c. Torque generated by water pressure acting on the internal turbine is conducted by rotatable drive shaft 7 to drive generator 8. Stuffing box assembly 6 facilitates extension of drive shaft 7 out of the wet interior of elbow piping element 2c. Electrical output from generator 8 is fed to a rectifier and inverter housed within electrical cabinet 9 by feed wire cable 77. On leaving the turbines, water flow is recombined as shown in the branch of tee piping element 2e, or, optionally, another wye piping element. Water flow within dual turbine power recovery station 21 is then conducted to pressure reducing valve 5, where it is maintained at a preset controlled pressure for delivery to water users. Water flow exits hydraulic power recovery station 21 at a reduced pressure via outlet 101, flowing to the system's existing pressure reducing valve.

Figure 5:
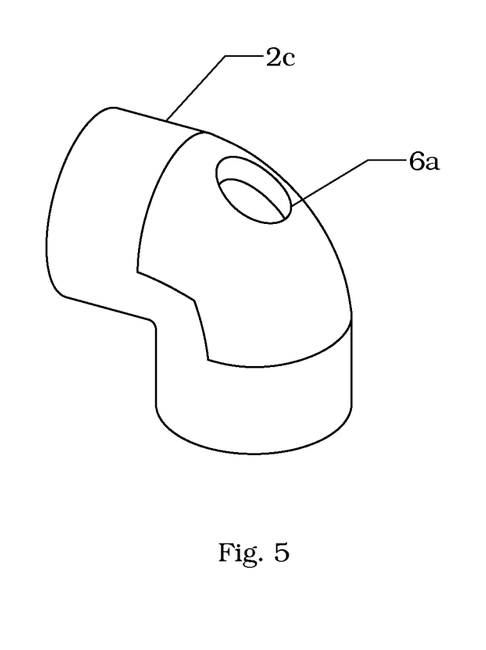
FIG. 5 depicts on exemplary embodiment of an elbow pipe element suitable for use with the present invention.

FIG. 5 depicts elbow pipe element 2c, which has been modified by the addition of a hole 6a opposite one of the pipe element's open ends. Hole 6a is added to the pipe element in order to facilitate attachment of stuffing housing 61, shown in FIG. 6. Open faces of elbow pipe element 2c can be at any convenient angle, which allows enough material opposite of one face to place hole 6a fully within the piping element's surface.

Figure 6:
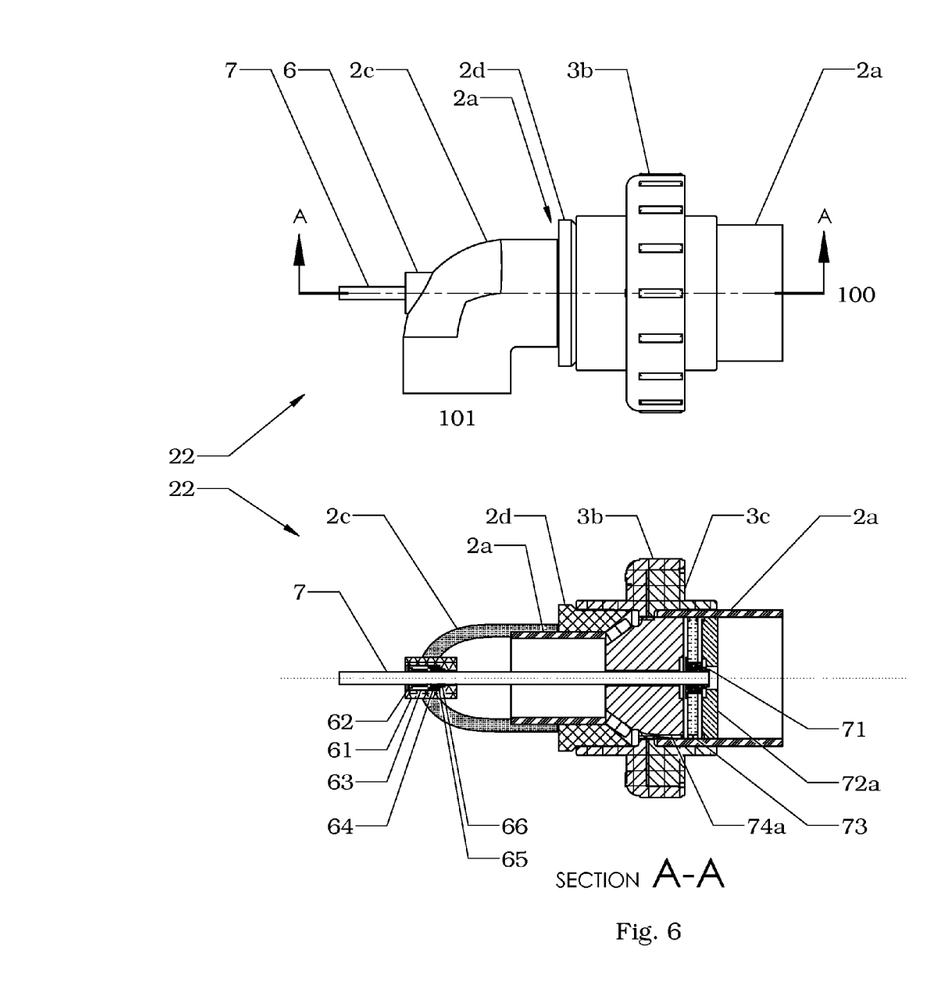
FIG. 6 is a cross section of one embodiment of a turbine of the present invention housed within union pipe fitting elements, and a elevation view of the union pipe fitting elements.
Figure 13:
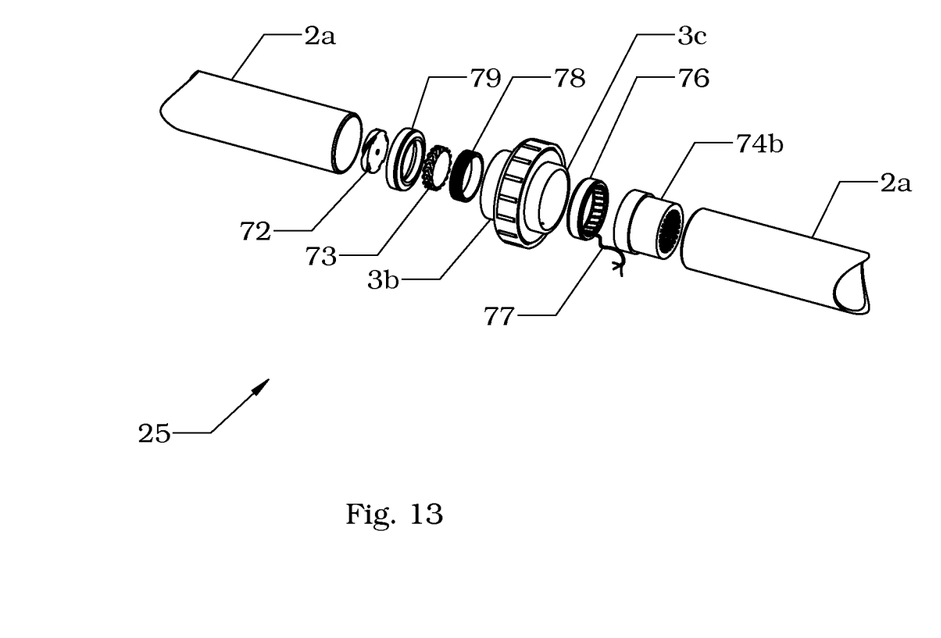
FIG. 13 is an exploded view of the embodiment of the present invention depicted in claim 12.

FIG. 6 shows a turbine section 22 housed within union pipe fitting elements 3b and 3c, as part of a hydraulic pressure reducing system. The union pipe fitting is preferably composed of female half 3b with rotatable threaded nut, and male half 3c with fixed mating threads, and preferably includes a sealing element. Pressurized water enters via inlet 100 and is admitted to the turbine by straight piping element 2a, where the water encounters nozzle plate 72a. Nozzle plate 72a is preferably a round component fitting within the pipe element housing, with channels cut into the periphery thereof to direct fluid flow. Nozzle plate 72a is non-rotatably fixed to piping element 2a. Nozzle plate 72a, in conjunction with piping element 2a, form nozzle channels that convert the water's flow in the pipe from substantially axial velocity, aligned with the pipe's centerline, to substantially tangential, with water particles orbiting about the pipe's centerline. In addition to changing the water's direction to tangential, nozzles formed by piping element 2a and nozzle plate 72a accelerate the water's speed above that present in piping element 2a prior to encountering nozzle plate 72a, producing tangential water jets. On leaving the nozzles, water jets encounter channels a runner 73 which direct the water jets in an arc, altering the water's tangential direction. Runner 73 is preferably a cylindrical component that converts fluid flowing around it to torque and rotational speed. Water emerging from runner 73, having some tangential component of velocity remaining, next encounters diffuser 74a fixed within the piping element. Diffuser 74a is an external passage diffuser, but an internal passage diffuser 74b, as shown in FIG. 13, may also be used in conjunction with the present invention. Diffuser 74a straightens the flow, causing it to be once more substantially axial with respect to the centerline of the pipe elements, and also reduces the speed of the flow. Water travels through elbow piping element 2c at reduced pressure, exiting via outlet 101 and flowing to the system's pressure reducing valve.

Runner 73 is fixed to driveshaft 7 by shaft connector 71, which provides an axially and torsionally rigid connection between the shaft and runner. Driveshaft 7 passes out of the piping elements guided by the central bore of diffuser 74a, until it reaches shaft seal 66 within stuffing box assembly 6. Shaft seal 66 allows driveshaft 7 to turn without significant hindrance, and without leaking pressurized water from inside the pipe.

Figure 7:
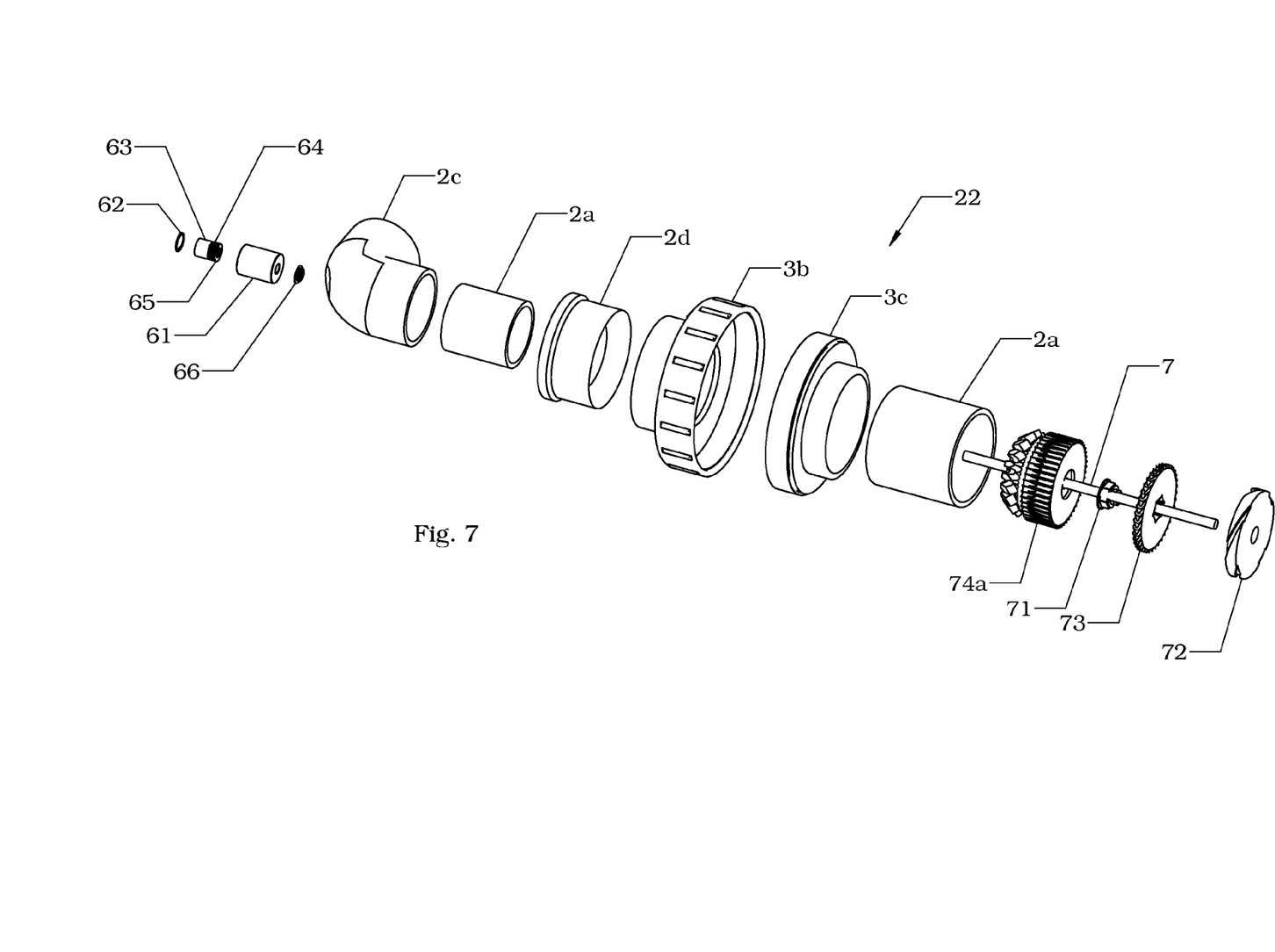
FIG. 7 is an exploded view of exemplary pipe fitting elements having one embodiment of a turbine system of the present invention associated therewith.

FIG. 7 is an exploded view of the components of turbine section 22 shown in FIG. 6. As can be readily seen in this view, stuffing box assembly 6 includes a fluid seal 66, such as a bearing washer spreading the load of a preload spring over the face of the seal, a preload spring 64, spring retainer 63 with one end engaging the spring's inner diameter or outer diameter, and the other end abutting a retainer, and circlip retainer 62, all retained within stuffing box housing 61. Housing 61 is preferably affixed to elbow pipe element 2c.

Figure 8:
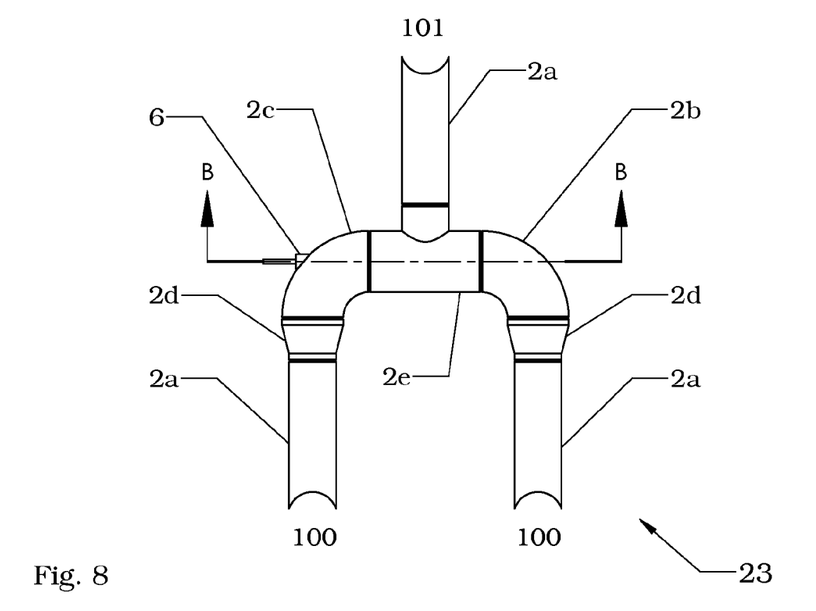
FIG. 8 illustrates one embodiment of the present invention depicting two exemplary hydraulic turbines associated with a single drive shaft. A cross-section of the same is also provided.

FIG. 8 shows turbine section 23 of a pressure reducing system with water driving two hydraulic turbines fixed to one rotatable drive shaft, as shown in FIG. 4. Pressurized water enters at inlet 100 and is admitted to the turbine in two paths via piping elements 2a, and can use size adapter piping elements 2d to accommodate turbine components with water flow. Water is admitted to the turbines by elbow piping elements 2b and 2c. The turbines are housed in tee piping element 2e. On exiting the turbines, water flows are combined in tee piping element 2e and leave the turbine via outlet 101 at reduced pressure, flowing to the system pressure reducing valve.

Figure 9:
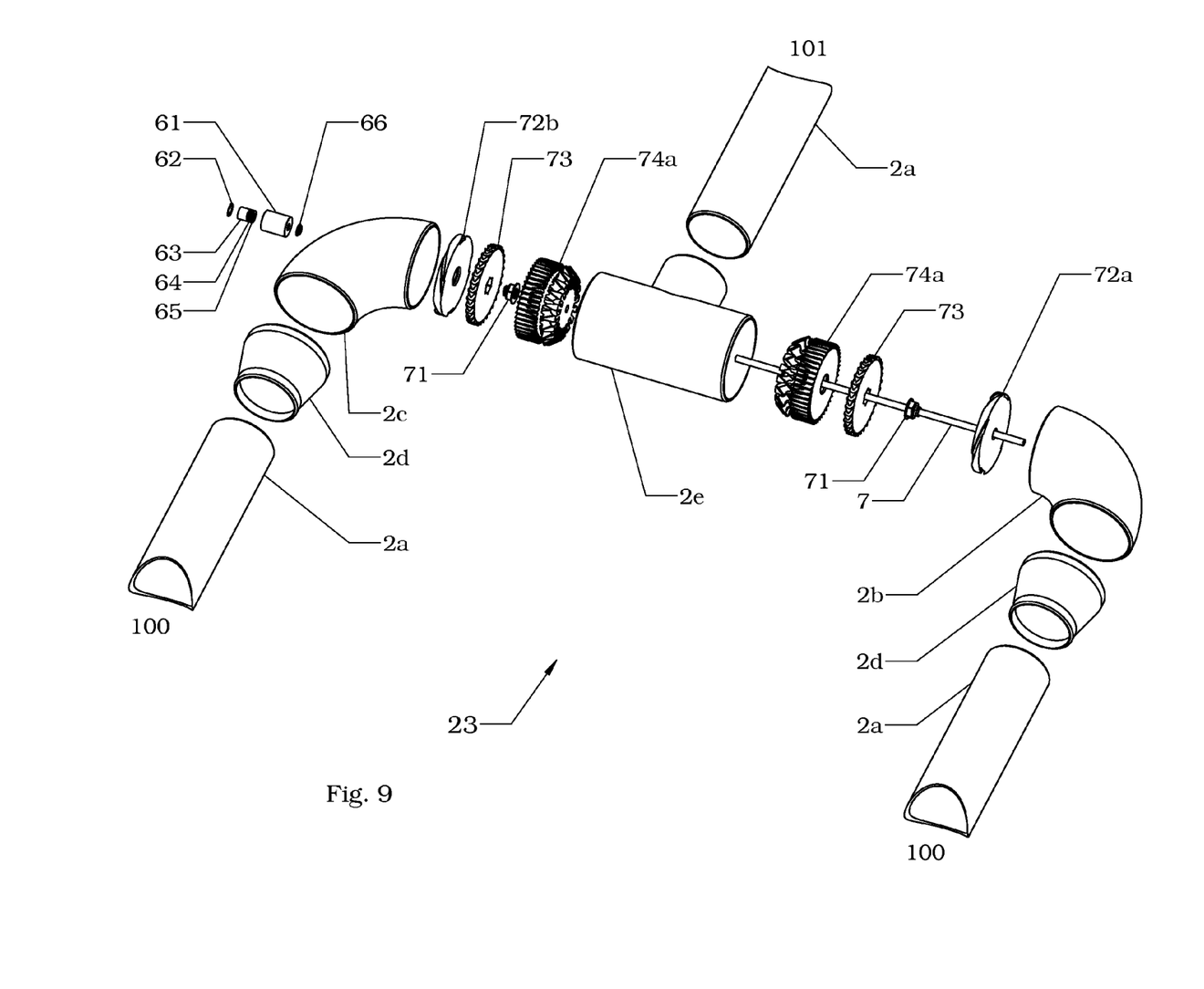
FIG. 9 is an exploded view of the embodiment of the present invention shown in FIG. 8.

FIG. 9 is an exploded view of the components of turbine section 23 shown in FIG. 8. The paired turbines are configured on their single drive shaft 7 as shown in FIG. 6, with water from both sides passing over nozzles 72a and 72b to runners 73, then past diffusers 74. Nozzle 72b has channels of opposite rotation from that of nozzle 72a. Runners 73 are both fixed to the single driveshaft 7 by shaft connectors 71.

Figure 10:
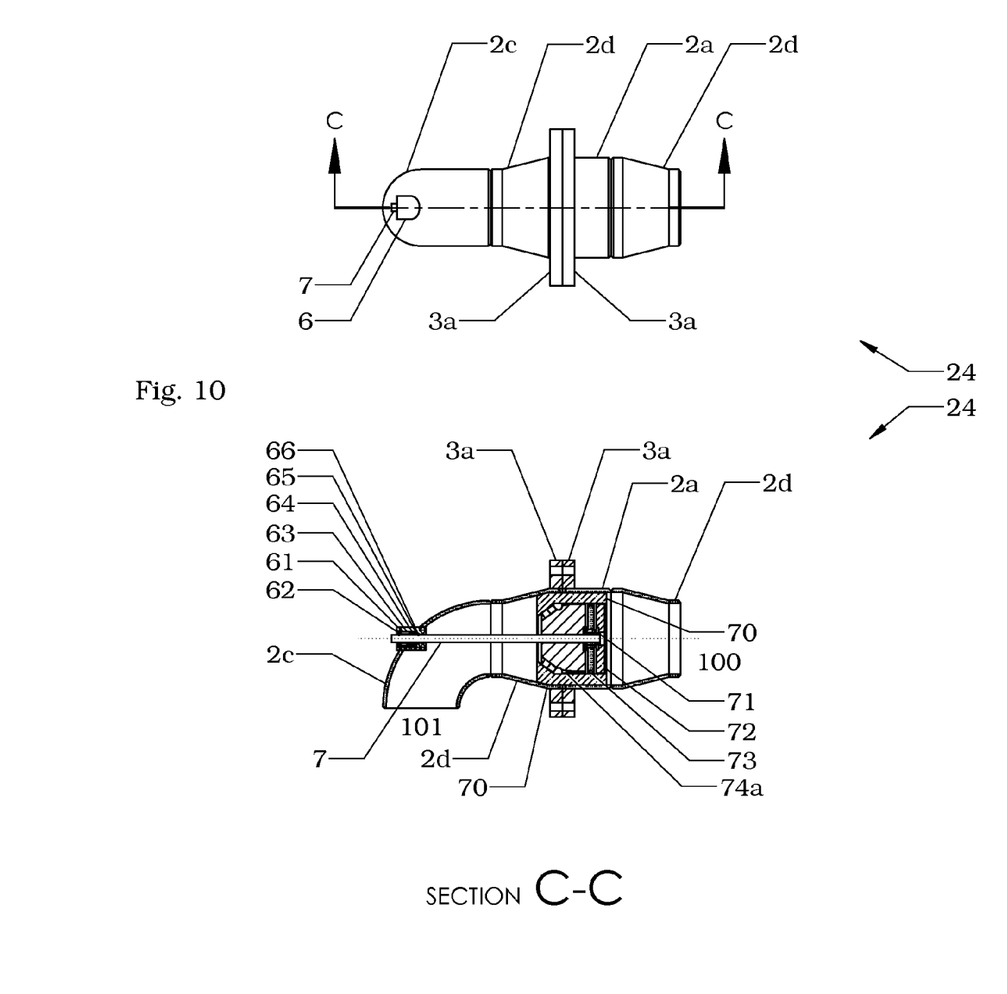
FIG. 10 provides a cross-section of one embodiment of a pressure reducing system of the present invention with a flange fitting element in the piping connection. An elevation view is also provided.

FIG. 10 shows a turbine section 24 of a pressure reducing system housed within flange fitting element 3a piping connection. The turbine is supported by cylindrical insert 70, which is attached to flange (or other) fitting element 3a. Cylindrical insert 70 compensates for the difference in diameter between the turbine's various components and that of the pipe fitting elements housing them.

Figure 11:
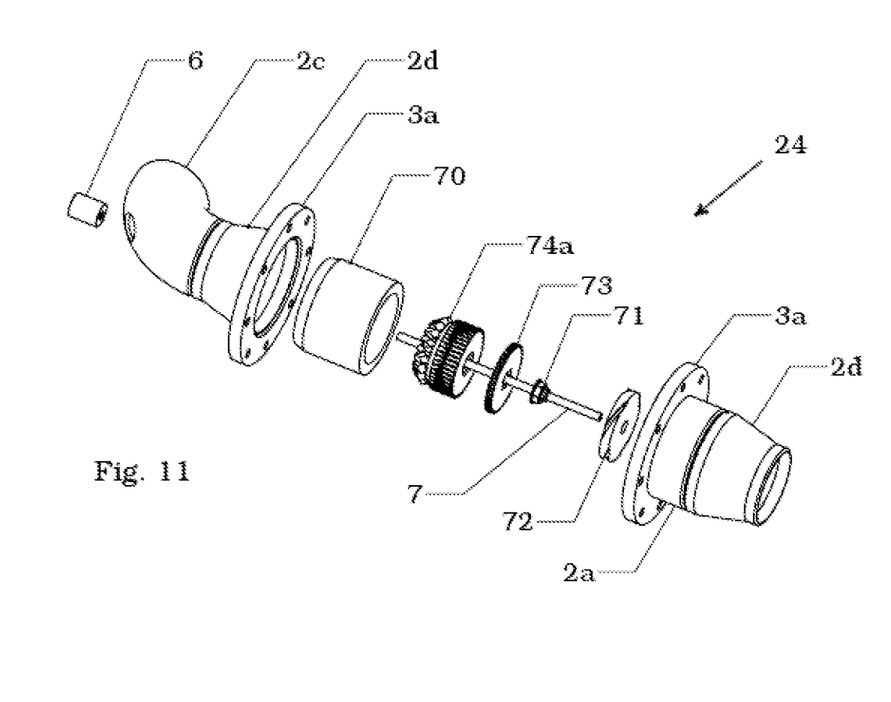
FIG. 11 is an exploded view of the embodiment of the present invention shown in FIG. 10.

FIG. 11 is an exploded view of the components of turbine section 24 shown in FIG. 10. This assembly is substantially similar to turbine section 22 depicted in FIG. 6, with the addition of cylindrical insert housing 70. Turbine elements are first assembled onto an additional cylindrical housing 70, which is assembled into flange fitting element 3a.

Figure 12:
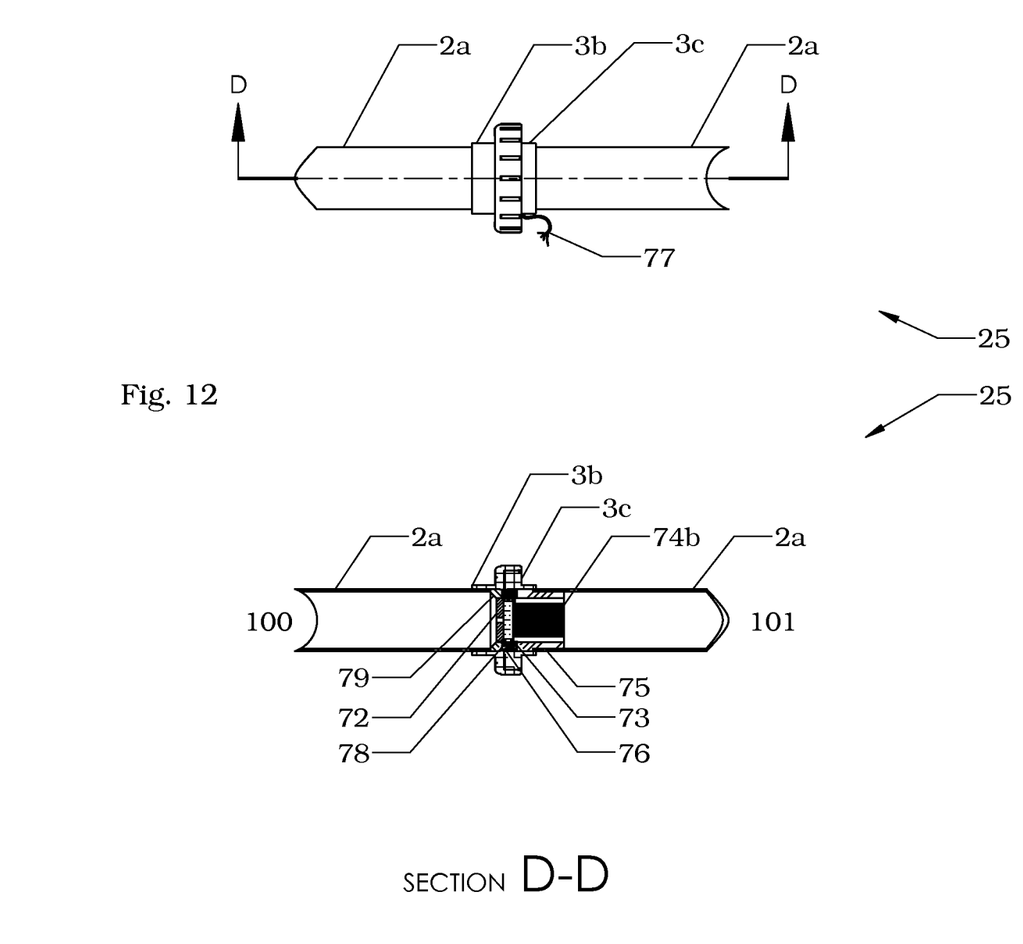
FIG. 12 is a cross-section view of one embodiment of an integrated power recovery system of the present invention. An elevation view is also provided.

FIG. 12 shows an integrated turbine and generator 25 housed within a union pipe fitting with stator 76 and rotor 78 electrical generation components housed within union pipe fitting elements 3b and 3c as part of a hydraulic pressure reducing system. Feed wire cable 77 protrudes through union pipe fitting element 3c (or 3b) and is sealed against water leakage.

Water enters power recovery section 25 via inlet 100 at elevated pressure, traveling through straight piping element 2a where it encounters nozzle 72a, as described above, which accelerates the water and tangentially directs flow. The accelerated and substantially tangential flow encounters runner 73 as previously described, whereupon flow is returned to substantially axial flow and slowed. Nozzle 72a and internal diffuser 74b may be supported by optional cylindrical spacers 78 and 79. Water flows at reduced pressure, exiting at outlet 101 to the system pressure reducing valve.

FIG. 13 is an exploded view of the components of turbine section 25 shown in FIG. 12.

The embodiments of the invention provided in FIGS. 12 and 13 do not include a drive shaft 7. These embodiments of the present invention include a rotor 78 that is rotated by runner 73, and a stator 76 that is preferably fixedly attached to the interior surface of a pipe or pipe element. Rotor 78 preferably includes magnets, whereas stator 76 preferably includes coils. Rotation of rotor 78 within stator 76 generates current in the coils of stator 76 via induction. Runner 73 is disposed within stator 76 and rotates therein. Feed wire cable 77 extends from stator 76, through a sealed opening in the pipe or piping element, and to a generator. Because there is no drive shaft 7 there is no need to physically accommodate a drive shaft structure. These embodiments of the present invention may be readily utilized with existing pipeline structures where inclusion of a drive shaft 7 is not feasible due to spatial constraints. In some preferred embodiments of the present invention, the turbine or motor of the present invention drives a generator regulated by an inverter complying with IEEE 1547 standards. These relate to standards for interconnecting distributed resources with electric power systems. In other preferred embodiments, the inverter may comply with UL 1741 standards relating to inverters, converters, controllers and interconnection system equipment for use with distributed energy resources The present invention includes a number of components, as described above, that are fixed to the pipe or pipe fixture in which the present invention is being utilized. Other components of the present invention are in motion when the present invention is in operation, and many of these components are in motion relative to other fixed or moving components of the system. As noted above, it is contemplated that the moving components of the present invention operate with the use of any lubricant other than the fluid, such as, for example, water, flowing through the system. In order for the fluid to perform this function properly, components that are in motion relative to one another, or "facing" one another, should be comprised of chemically different materials. For example, embodiments of the present invention including a nozzle, runner, and diffuser, the nozzle and runner should be comprised of chemically-distinct materials, as should the runner and diffuser. The nozzle and diffuser, however, may be comprised of chemically-similar or identical materials without impacting the lubricating quality of the fluid moving through the system. Materials useful in the construction of the components of the present invention include synthetic polymers, metals, ceramics, and combinations of these materials. It is contemplated, however, that any suitable materials may be used.

In preferred embodiments of the present invention, the pipes and pipe fittings in which the present invention is utilized also serve as the pressure housing of the hydraulic turbine. The pipes and pipe fittings have substantial structural strength and stiffness to allow for use of these components of the system as a pressure housing. In some of the embodiments, various components of the present invention may be cast as structural components of the pipes or fittings themselves.

The information provided above is illustrative of the present invention and is not intended to be limiting. Various modifications to the present invention will be readily apparent to those of skill in the art upon reading this disclosure. It is contemplated that such modifications are within the spirit and scope of the present invention.

Having thus described the preferred embodiment of the invention, what is claimed as new and desired to be protected by Letters Patent includes the following:

1. An in-pipe hydraulic turbine system comprising:
   a pipeline for fluid transport, said pipeline comprising an inlet, an outlet, and a pressure-reducing valve; and
   a turbine disposed within said pipeline between said inlet and said outlet and upstream of said pressure-reducing valve, the turbine comprising:
      an output shaft; and
      a runner fixedly attached to the output shaft,
   the output shaft being substantially aligned with the direction of fluid flow through the system;
   a fixed, non-rotatable nozzle disposed within said pipeline between said inlet and said turbine, the nozzle configured to accelerate the flow of a fluid moving through said pipeline and to convert said fluid flow to a substantially tangential flow,
   wherein said turbine is actuated by a fluid moving through said pipeline, and further wherein said turbine leaves a fluid pressure downstream of said turbine that exceeds a set control pressure of the pressure-reducing valve.

2. The in-pipe hydraulic turbine system according to claim 1, wherein the turbine is selected from the group consisting of an impulse turbine and a reaction turbine.

3. The in-pipe hydraulic turbine system according to claim 1, wherein the turbine is constructed from materials requiring no lubrication apart from that provided by the fluid moving through the system.

4. The in-pipe hydraulic turbine system according to claim 1, wherein the turbine includes a plurality of running surfaces, the running surfaces comprised of materials selected from the group consisting of synthetic polymers, metals, ceramics, and combinations thereof,
   wherein the facing surfaces of moving components of said turbine system are constructed from chemically-distinct materials,
   and further wherein fluid traveling through the system is induced into a plurality of interstitial running spaces of said turbine.

5. The in-pipe hydraulic turbine system according to claim 1, wherein the nozzle comprises a rounded plate, the periphery thereof defining at least one channel for allowing fluid flow between the nozzle and an interior wall of said pipeline.

6. The in-pipe hydraulic turbine system according to claim 1, further comprising:
   a diffuser disposed within said pipeline between said turbine and said outlet, the diffuser in fluid communication with said turbine, the diffuser sized and shaped to decelerate the flow of a fluid moving through said pipeline and to convert said flow to a substantially axial flow.

7. The in-pipe hydraulic turbine system according to claim 5, wherein the nozzle has a diameter concentric with a diameter of said pipeline.

8. The in-pipe hydraulic turbine system according to claim 6, wherein the diffuser is substantially cylindrical and has a diameter concentric with a diameter of said pipeline.

9. The in-pipe hydraulic turbine system according to claim 1, wherein said output shaft drives an electrical generator.

10. The in-pipe hydraulic turbine system according to claim 9, wherein the output of the electrical generator is selected from the group consisting of alternating current and direct current.

11. The in-pipe hydraulic turbine system according to claim 9, wherein the output of the electrical generator is regulated by a device selected from the group consisting of a rectifier, an inverter, and a grid-tieable inverter.

12. The in-pipe hydraulic turbine system according to claim 1, wherein the pipeline comprises an elbow bend, the elbow bend defining an opening therein, the output shaft extending through said opening.

13. The in-pipe hydraulic turbine system according to claim 1 wherein said system drives a generator producing a fluctuating, random direct current, the in-pipe hydraulic turbine system further comprising an inverter complying with standards selected from the group consisting of IEEE 1547 and UL 1741 the inverter converting the output of the generator to an alternating current voltage, frequency, and phase-matched as appropriate for an associated electrical grid.

14. In a fluid pipeline having a first pipeline portion upstream of a pressure-reducing valve and a second pipeline portion downstream of the pressure-reducing valve, fluid in the first pipeline portion having a first pressure and fluid in the second pipeline portion having a second pressure, the pressure reducing valve having a set control pressure, the improvement comprising:
   a turbine disposed within the first pipeline portion, the turbine comprising an output shaft and a runner fixedly attached to the output shaft;
   an electrical generator coupled to said output shaft and driven thereby; and
   an inverter in electrical communication with said electrical generator, wherein the turbine is actuated by fluid moving through said pipeline and configured such that the fluid pressure remaining in the first pipeline portion downstream of said turbine is greater than the set control pressure of the pressure-reducing valve.

15. A method of generating electricity from usable pressure within a fluid pipeline having a pressure-reducing valve, the method comprising the steps of:
   a) disposing within said fluid pipeline, upstream of the pressure-reducing valve, a turbine comprising an output shaft and a runner, the output shaft coupled with an electrical generator driven by the output shaft and in electrical communication with an inverter;
   b) allowing said turbine to be actuated by fluid flow within said pipeline so long as the fluid pressure within said pipeline downstream of the turbine is greater than the set control pressure of the pressure-reducing valve; and c) disallowing the actuation of said turbine when the fluid pressure within said pipeline downstream of the turbine is not greater than the set control pressure of the pressure-reducing valve.

* * * * *